No. 654,013. Patented July 17, 1900.
D. LUMBERT.
CRANBERRY GATHERER.
(Application filed Apr. 6, 1900.)
(No Model.)

WITNESSES:
Rollin Abell.
Annie J. Dailey.

INVENTOR:
Daniel Lumbert,
by Crossley & Davis,
his Attys.

UNITED STATES PATENT OFFICE.

DANIEL LUMBERT, OF CENTREVILLE, MASSACHUSETTS, ASSIGNOR TO WILLIAM S. LUMBERT AND HARRIE F. LUMBERT, OF SAME PLACE.

CRANBERRY-GATHERER.

SPECIFICATION forming part of Letters Patent No. 654,013, dated July 17, 1900.

Application filed April 6, 1900. Serial No. 11,839. (No model.)

*To all whom it may concern:*

Be it known that I, DANIEL LUMBERT, of Centreville, in the county of Barnstable and State of Massachusetts, have invented certain new and useful Improvements in Cranberry-Gatherers, of which the following is a description sufficiently full, clear, and exact to enable those skilled in the art to which it appertains or with which it is most nearly connected to make and use the same.

The object of the present invention is to produce an improved form of cranberry-gathering machine having advantages in economy of construction, facility of manipulation, and efficiency in operation, these points being gained by reducing the number of necessary parts, rendering the stripping action wholly automatic, and at the same time making such action positive and unvarying.

In carrying out my invention I provide a machine which in operation requires merely to be thrust forward and drawn backward in the vines until charged with berries, which are automatically stripped from the vines in the backward movement of the machine, and then when the full complement of berries has been gathered in the machine it can be readily emptied and the gathering resumed.

By my improvement I am enabled to gather cranberries more effectively than is now practiced with machines requiring manipulation of the stripper by thumb action, and I entirely dispense with the latter, while greatly simplifying the construction. Moreover, my improved arrangement for effecting automatic stripping renders entirely practical the employment of a machine of very much enlarged capacity mounted on wheels and equipped to be run, much after the manner of a lawn-mower, by one or more operators standing upright.

The drawings which accompany and form part of this specification illustrate preferred forms of embodiment of the invention, which are specifically described hereinafter.

Figure 1:
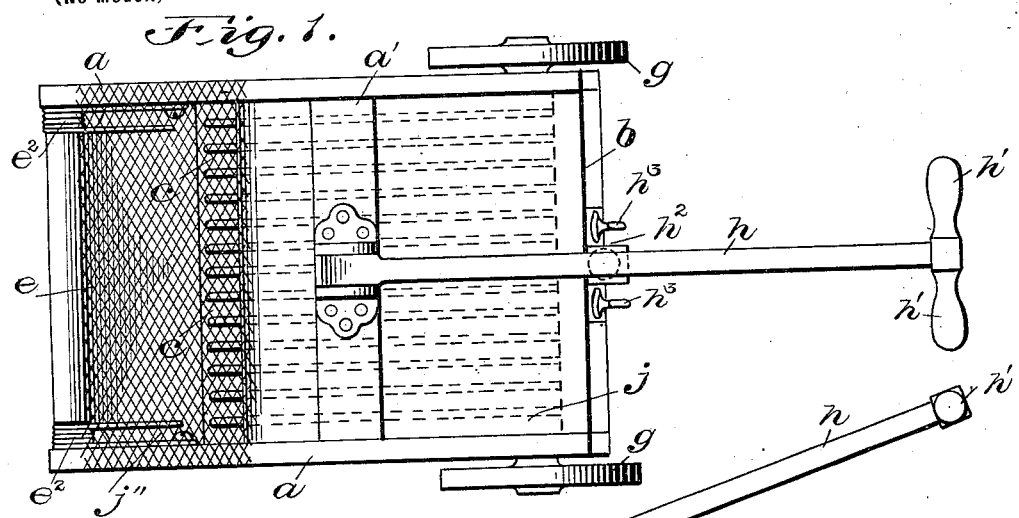
Figure 2:
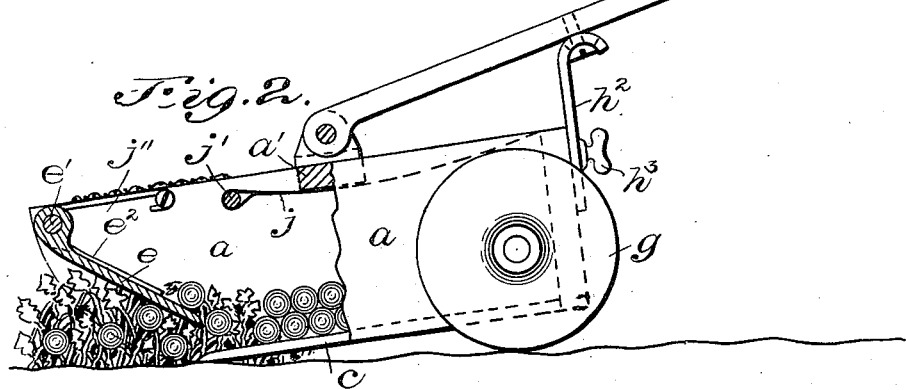
Figure 3:
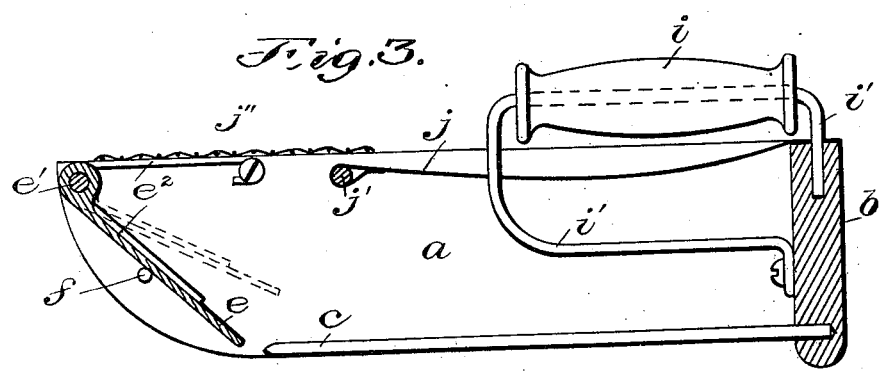

Figure 1 represents in top plan view a wheeled cranberry-gatherer embodying my invention. Fig. 2 represents the same in side elevation, partly broken away and in section, illustrating the action. Fig. 3 represents in central longitudinal section a hand-size form of machine embodying the invention.

Except for the manipulating means the construction of the two forms shown is practically the same and one description will apply to each.

The framework of the machine comprises side pieces $a$ and a rear end piece $b$, preferably of wood, and the pickers are in the form of a series of rods $c$, secured at their rear ends in the lower part of the rear frame-piece $b$ and extending forward to a line in rear of the foremost portions of the side pieces $a$, which preferably have their under edges rounded from this line where the rods terminate to their top edges, so as to constitute in effect shoes to work over the vines. The rods of the series all lie in the same plane and preferably run a little below the plane of the bottom edges of the side pieces $a$, the rear end piece $b$ projecting below the latter sufficiently to afford substantial support for the rods. A flat plate $e$ is pivoted, by means of a pintle $e'$, to the sides $a$, at the forward upper parts thereof, said plate extending from side to side of the frame and rearward and downward, so as to bring its straight lower edge to a line a short distance in front of and slightly above the line of the front ends of the picker-rods. This defines the normal position of the plate, in which it is held by coiled springs $e^2$, surrounding the pintle $e'$ and secured to the side pieces $a$ at one end, while their other ends bear against the inner side of the plate to hold the same against stop-pins $f$, which project from the side pieces $a$.

In operation when the machine is thrust forward the plate $e$ encounters the vines and is swung backward by them, so that as the rods work into the vines and below the berries the latter may be received in the machine above the rods, which are arranged close enough together to prevent passage of berries through between them. Then upon the machine being drawn back the plate $e$ instantly returns to its normal position, closing the throat through which the berries were admitted, so that only the vines escape between the lower edge of the plate and the ends of the rods, the berries being stripped off and kept in the machine. It will be seen that this stripping operation takes place automatically, no manipulation of the stripper-plate being required, but its action resulting from the mere thrusting forward and drawing backward of the machine. When the machine has become well charged with berries, it may be emptied by simply dumping the berries out under the stripper-plate after pressing the latter back to allow the berries to pass out under it.

Figs. 1 and 2 represent an embodiment of the invention in a machine of large size intended to be operated by one or more persons standing upright, much as in running a lawn-mower, and this machine is mounted at the rear upon wheels $g$, one at each side and of a size and so journaled as to elevate the rear part of the machine from the ground, whereby the desired pitch is given to the picker-rods and stripper-plate. A push-rod $h$ is pivoted at its forward end to a bracket on a cross-bar $a'$, extending between the side pieces $a$ at about the middle of the machine, and this rod extends rearwardly and upwardly and is equipped with suitable handles $h'$. A bracket $h^2$ supports the rod from the rear part of the machine, said bracket being secured to the rear piece $b$ by thumb-screws $h^3$, which can be inserted in different holes to secure different adjustments of the handle-bar. The bracket has a more or less loose connection with the bar to facilitate change in vertical adjustment of the latter.

The form shown in Fig. 3 is adapted for a small-size machine to be carried in and operated with one hand, and for this purpose has a handle $i$ extending longitudinally over the top, said handle being supported by a stout wire $i'$, running through it and secured at both ends to the rear frame-piece $b$.

In each form of machine shown a flexible sheet $j$ is employed, extending from side to side and from the rear frame-piece $b$ to a cross-bar $j'$, and a wire-netting $j''$ extends over the remainder of the top of the machine. This covering prevents escape of the berries while the machine is being worked.

It will now be seen that the forms of machines here shown are well adapted to fulfil the objects primarily set forth. However, it is to be understood that modifications may be made without departing from the spirit and scope of the invention.

Having thus explained the nature of the invention and described a way of constructing and using the same, though without attempting to set forth all of the forms in which it may be made or all of the modes of its use, it is declared that what is claimed is—

1. A machine of the character described comprising in its construction a frame with side pieces and an end piece, a series of picker-rods extending forward from the lower portion of the latter and terminating on a line in rear of the foremost portions of the side pieces, and a stripper-plate pivoted to the said foremost portions of the side pieces at the upper parts thereof and extending rearwardly toward the front ends of the picker-rods, said plate being spring-pressed against stops so that normally its acting edge stands just forward of the ends of the picker-rods ready to be pressed backward by the vines while the picker-rods pass through the same under the berries, substantially as described.

2. A machine of the character described comprising in its construction a frame with side pieces and an end piece, a series of picker-rods extending forward from the lower portion of the latter and terminating on a line in rear of the foremost portions of the side pieces, and a stripper-plate pivoted to the said foremost portions of the side pieces at the upper parts thereof and extending rearwardly toward the front ends of the picker-rods, said plate being spring-pressed against stops so that normally its acting edge stands just forward of the ends of the picker-rods ready to be pressed backward by the vines while the picker-rods pass through the same under the berries, together with wheels at the rear of the frame elevating the same from the ground, and a handle by which to propel the machine, substantially as described.

In testimony whereof I have signed my name to this specification, in the presence of two subscribing witnesses, this 3d day of April, A. D. 1900.

DANIEL LUMBERT.

Witnesses:
CHARLES F. PARKER,
GERTRUDE L. TORREY.